July 21, 1959  P. E. JELLYMAN ET AL  2,895,260
METHOD OF TREATING A GLASS INSULATOR
Filed Feb. 8, 1955
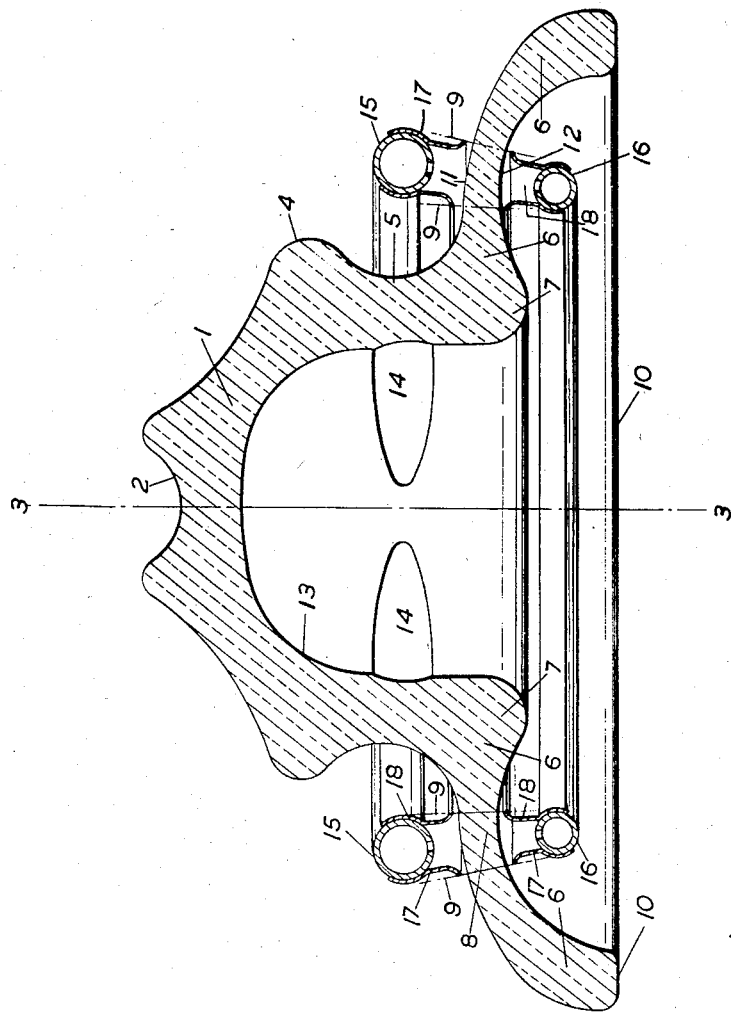
Inventors
P. E. Jellyman
G. A. Dickinson
H. F. Macintosh
By
Morrison Kennedy Campbell
Attorneys A United States Patent Office 2,895,260
Patented July 21, 1959

2,895,260
METHOD OF TREATING A GLASS INSULATOR

Philip E. Jellyman, Eccleston, St. Helens, and George A. Dickinson, Eccleston Hill, St. Helens, England, and Hamish F. Macintosh, Glenaveron, Brora, Sutherland, Scotland, assignors to Pilkington Brothers Limited, Liverpool, England, a company of Great Britain Application February 8, 1955, Serial No. 486,962

Claims priority, application Great Britain February 11, 1954

2 Claims. (Cl. 49—89)

This invention relates to the manufacture of toughened glass insulators such as are used to support power cables and which sustain heavy loads for a long time.

Such insulators sometimes comprise a hollow head and a skirt (or shed) emanating radially from the head, which head and skirt are symmetrically arranged about the axis of the insulator, the head carrying the mechanical load. In order to improve the mechanical strength of such a glass insulator, it has been proposed to toughen the head whilst the skirt is either untoughened or has a degree of toughening which is so low that breakage of the skirt does not cause the remainder of the insulator to disintegrate, and it has also been proposed to toughen the insulator as a whole, the rate of cooling of thinner portions being lower than the rate of cooling of the thicker portions.

Glass is toughened by subjecting the glass when at a temperature just above the softening point of the glass to a rapid chilling effected by directing jets (termed "Quenching jets") on the glass. The degree of toughening achieved varies with the rate of chilling. The toughened glass comprises outer layers under compression which envelop glass in tension, hence the type of disintegration into small sections (termed "dicing") of toughened glass when the surface layer is fractured.

Electrical insulators are produced by flowing the requisite sized gob into a mould and pressing the glass to the requisite shape. In the glass, when the mould is opened, differences in temperature occur, the glass in contact with the wall of the mould having a lower temperature than the rest of the glass, and before a toughening operation on such an insulator is started, it is necessary to place the insulator in a temperature equalising furnace, a suitable temperature being about 1200° F. (649° C.).

A main object of the present invention is to provide an improved method of manufacturing toughened glass insulators in which a barrier of glass is produced in the skirt and as near as possible to the head, which barrier prevents the propagation of a fracture initiated in the skirt below the barrier through the barrier upwards to the head.

A method of making a toughened glass insulator of the kind used for supporting electrical power cables and including a hollow head and integral skirt emanating radially therefrom, wherein the insulator is produced by a pressing operation, and is thermally treated in a temperature equalising furnace, in accordance with the present invention, is characterised by partially extracting heat as quickly as possible from an annular body of glass in the skirt and near the head after the insulator has been withdrawn from the temperature equalising furnace by heat exchange with air directed on to the annular body of glass, so that a desired temperature difference between the glass in the annulus and the ambient glass in the insulator is obtained, and immediately thereafter rapidly chilling the outer and inner surfaces of the insulator.

By the method of manufacturing an insulator according to the present invention, the annular body constitutes a collar of glass which acts as a barrier against propagation of a fracture from the skirt upwardly to the head or vice versa.

In order that the invention may be more clearly understood one preferred embodiment in which the invention is incorporated on a pin-type insulator will now be described by way of example with reference to the accompanying drawing.

In the drawing, which is a central vertical section, and shows the usual external shape of a metal-capped tempered glass insulator used for supporting power lines, the hollow head 1 of the insulator is pressed out with a recess 2, for a power cable, at the top of the vertical axis 3—3, and with an annular shoulder 4 below which is an annular recess 5 adapted to receive the usual binding wire for the cable. Radially outward (i.e. from the axis 3—3) from the bottom of the recess 5 emanates the skirt 6. The head is extended below the top of the skirt to produce the base 7 of the head.

Generally speaking, therefore, the hollow head is of cylindrical form with a recessed top and sides, firmly set within the upper part of the skirt, which latter is thickest at the bottom and progressively decreases in thickness towards the upper part of the skirt.

In accordance with the invention an annular body of glass indicated at 8 in the upper part of the skirt 6, and near to the head 1, defined by the chain lines 9—9, is subjected to a preliminary restricted cooling as hereinafter described as a step precedent to the chilling of the insulator for the purpose of producing a toughened glass insulator. The skirt 6 of the insulator comprises a rounded rim 10 and the annular body 8 comprises a convex face 11 and a concave face 12, these faces being confluent with the external and internal faces respectively of the insulator.

The interior of the head 1, in known manner provides a socket 13 for the head of a lower insulator (sometimes referred to as a "lower shed" which latter head is cemented to a supporting pin) on which such insulators are usually mounted, the socket having grooves 14 which form pockets for cementitious material introduced between the socket and the head of the lower shed, so that an interlock is formed as the cementitious material sets.

By utilizing the form of construction hereinbefore described a mechanically sound structure is devised, and after the pressed article has been subjected to temperature equalizing treatment followed by subjecting the annular body of glass 8 to a predetermined restricted heat loss at an appropriate rate in accordance with the invention, an insulator of sufficient strength is produced to carry not only the normal load of the cable, but also the seasonal extra loads such as are produced by snow and other conditions derived from low temperatures. Moreover, as the head does not disintegrate if the skirt is fractured, it is not necessary to employ the usual metallic cap which is cemented to the exterior of the head to hold it together.

In carrying out the invention, a pressed glass insulator of the kind described is heated uniformly and the temperature of the annular body of glass 8 in the skirt is subjected to a restricted reduction by heat exchange with air directed on to the annular body to produce a predetermined difference in temperature between the glass in the annular body and the ambient glass, and immediately thereafter the insulator as a whole is rapidly chilled.

The production of the annular barrier 8 may be effected by employing rings 15, 16 connected to air supply (not shown) and provided with nozzles directed respectively to the convex and concave faces of the annular body, whereby the annular body of glass is cooled to a temperature lower than that of the ambient glass. Experiments have shown that cooling the annular body 8 thus to a temperature about 180° F. lower than that of the ambient glass produces a very satisfactory barrier which prevents the propagation of a fracture from the skirt to the head and vice versa.

Fences 17, 18 may be associated with the rings 15, 16 to restrict the impact of the cooling air to the annular band 8.

The toughening operation may be effected by directing quenching jets into the socket of the head, simultaneously, applying quenching jets to the top and sides of the head, and simultaneously quenching the glass of the skirt, the rates of cooling so produced being preferably adjusted over the various parts of the whole insulator so that there is the requisite rate of cooling required for the particular thickness of the article in the area cooled, as will be well understood in the art.

We claim:

1. A method of treating a moulded glass insulator having a hollow head and an integral skirt emanating radially from the base thereof, which method comprises thermally treating the insulator in a temperature equalizing furnace to equalize the temperature of the insulator at a point just above its softening point and promptly thereafter cooling with annularly disposed jets directed onto both sides of an annular zone in the skirt and near the head, said cooling being limited substantially to said zone to produce in the zone a temperature which is substantially less than the temperature of the surrounding glass, and then subjecting the insulator as a whole to a rapid chilling operation to toughen the insulator, the cooling of said zone being at a restricted rate due to the temperature differential so that the subsequent rapid chilling of the insulator as a whole causes said zone to be toughened to a lesser degree than the rest of the insulator to form a barrier against the propagation of a fracture in the skirt through the zone to the head or vice versa.

2. A method according to claim 1 wherein the cooling of said annular zone by said annularly-disposed jets produces in the zone a temperature which is about 180° F. less than the temperature of the surrounding glass.

References Cited in the file of this patent

UNITED STATES PATENTS

| | | |
|---|---|---|
| 2,177,324 | Long | Oct. 24, 1939 |
| 2,254,227 | Lewis | Sept. 2, 1941 |
| 2,418,713 | Holmes et al. | Apr. 8, 1947 |

FOREIGN PATENTS

| | | |
|---|---|---|
| 450,464 | Great Britain | July 17, 1936 |
| 1,038,439 | France | May 9, 1953 |
| 704,312 | Great Britain | Feb. 17, 1954 |